(12) United States Patent
Hinton

(10) Patent No.: US 10,270,602 B2
(45) Date of Patent: Apr. 23, 2019

(54) VERIFYING AND ENFORCING CERTIFICATE USE

(75) Inventor: Heather Maria Hinton, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 3236 days.

(21) Appl. No.: 12/243,014

(22) Filed: Oct. 1, 2008

(65) Prior Publication Data

US 2010/0083347 A1    Apr. 1, 2010

(51) Int. Cl.
*H04L 29/00* (2006.01)
*H04L 9/32* (2006.01)

(52) U.S. Cl.
CPC ........ *H04L 9/3268* (2013.01); *H04L 2209/76* (2013.01)

(58) Field of Classification Search
CPC ............................ H04L 9/3268; H04L 2209/76
USPC ................................................. 726/1; 713/156
See application file for complete search history.

(56) References Cited

U.S. PATENT DOCUMENTS

| | | | |
|---|---|---|---|
| 6,336,186 B1* | 1/2002 | Dyksterhouse et al. | 713/156 |
| 6,421,781 B1 | 7/2002 | Fox et al. | |
| 7,984,479 B2* | 7/2011 | Brabson et al. | 726/1 |
| 2002/0004773 A1 | 1/2002 | Xu et al. | |
| 2003/0004998 A1* | 1/2003 | Datta | 707/513 |
| 2003/0237004 A1* | 12/2003 | Okamura | 713/201 |
| 2005/0172128 A1 | 8/2005 | Little et al. | |
| 2005/0262345 A1 | 11/2005 | Moreau | |
| 2008/0052510 A1* | 2/2008 | Kim et al. | 713/158 |

FOREIGN PATENT DOCUMENTS

WO    2005060202 A1    6/2005

OTHER PUBLICATIONS

"Patrol® 7 Security Implementation: Securing the Data in Your Patrol—Managed Environment," BMC Software, Inc., Feb. 2002, http://documents.bmc.com/products/documents/34/09/13409/13409.pdf.

(Continued)

*Primary Examiner* — Brandon S Hoffman
*Assistant Examiner* — Michael D Anderson
(74) *Attorney, Agent, or Firm* — Garg Law Firm, PLLC; Rakesh Garg; Richard Wilhelm

(57) ABSTRACT

A method, system, and computer usable program product for verifying and enforcing certificate use are provided in the illustrative embodiments. A certificate is received from a sender. The certificate is validated before communicating a message associated with the certificate to a receiver. If the certificate is invalid, a policy is selected based on a type of invalidity of the certificate. An action is taken to enforce the policy for using the certificate. The certificate may be received from the sender at a proxy. The validating may further include verifying the validity of the certificate using a certificate from a certificate database accessible to the proxy over a network. the proxy may copy a part of the certificate database to a second certificate database local to the proxy. The validating may further include verifying the validity of the certificate using a certificate revocation list accessible to the proxy over a network.

35 Claims, 6 Drawing Sheets

(56) References Cited

OTHER PUBLICATIONS

Huang, "SSL and SSL Proxy Support for SOAP/XML Web Services," Masters project, Department of Computer Science, The Florida State University, Nov. 11, 2002, www.cs.fsu.edu/~engelen/HuangMasters.doc.
Taiwan Patent Office, Notification, AUS20080436TW1, dated Feb. 7, 2014.

* cited by examiner

US 10,270,602 B2

VERIFYING AND ENFORCING CERTIFICATE USE

BACKGROUND OF THE INVENTION

1. Field of the Invention

The present invention relates generally to an improved data processing system, and in particular, to a computer implemented method for enforcing the security of interactions between data processing systems. Still more particularly, the present invention relates to a computer implemented method, system, and computer usable program code for verifying and enforcing certificate use by an application in a data processing system.

2. Description of the Related Art

Applications executing on different data processing systems communicate with each other over data networks. Some of these data communications may have to include certain security mechanisms, such as encryption, digital signatures, and certificates.

Encryption is the process of transforming plain text using a cipher algorithm, to create an encoded form of plain text. In some other data communications, security mechanisms based on encryption may prevent repudiation of the communication by one or both parties, such as by using digital signatures. A digital signature provides a method of identifying and authenticating the author of message or communication based on the digital signature of that message, in a manner analogous to a handwritten signature. A digital signature may also be used to prove that a message has not been modified since it was initially signed. In some data communications, the security mechanism is designed to ensure the identity of the data processing systems on each end of the data communication, and encrypting the data communication between the two communicating systems.

Further, in these solutions, a "digital certificate" is used to verify an identity of an entity, such as an identity of the user, or of a data process system. A sender of a message may include a digital certificate with the message, so that the recipient can verify the identity of the sender.

For example, a digital signature using a digital certificate encrypts a message with a private key held by one and only one sending entity. Anyone holding the corresponding public key can validate the identity of the entity that generated the message. If the entity attempting to validate the signature does not have the required public key, the public key can be obtained from the digital certificate. This digital certificate may be carried with a message, such as in a WS-Secure-Conversation message exchange. Alternatively, the digital certificate may be already established in a local certificate store, as required by many applications, or may be optionally stored locally and exchanged with the messages, as with secure socket layer (SSL) negotiations. The digital certificate carries the binding of the public key to an entity's identity, the entity being the one that will be validated to have signed the message.

A digital certificate is also known simply as a certificate. Usually, a certificate itself is "signed" by a trusted third party, such as the issuer of the certificate called a certificate authority (CA), who can attest to the identity of the holder of the certificate to some degree. The CA also assigns parameters for the validity of the certificate. These parameters include the certificate's issuance date and expiration date, and many other attributes. A Certificate Authority will not validate the identity and the key pair binding represented by the certificate beyond the expiration date of the certificate.

Certificates can be assigned to software applications as well as data processing systems. Software applications and data processing systems can use the certificates, and the keys bound to the certificates, for authentication, encryption, non-repudiation, and other uses.

SUMMARY OF THE INVENTION

The illustrative embodiments provide a method, system, and computer usable program product for verifying and enforcing certificate use. A certificate is received from a sender. The certificate is validated by determining whether the certificate is invalid, before communicating a message associated with the certificate to a receiver. If the certificate is invalid, a policy is selected based on a type of invalidity of the certificate. An action is taken to enforce the policy for using the certificate.

In one embodiment, the certificate may be received from the sender at a proxy. The validating may further include verifying the validity of the certificate using a certificate from a certificate database. The certificate database may be accessible to the proxy over a network. In another embodiment, the proxy may copy a part of the certificate database accessible over to the network to a second certificate database local to the proxy.

In another embodiment, the validating may further include verifying the validity of the certificate using a certificate revocation list. The certificate revocation list may be accessible to the proxy over a network. In another embodiment, the proxy may copy a part of the certificate revocation list accessible over to the network to a second certificate revocation list local to the proxy.

In another embodiment, selecting the policy may further include selecting the policy from a policy store. The policy store may be accessible to the proxy over a network. In another embodiment, the proxy may copy a part of the policy accessible over to the network to a second policy store local to the proxy.

In another embodiment, an action according to the policy may be accepting the invalid certificate and the message, rejecting the certificate and the message, signing the message with a valid certificate, encrypting the message with a valid certificate, or a combination thereof. In an embodiment, the signing the message with a valid certificate may further include logging the signing, a reason for signing, or a combination thereof. The encrypting the message with a valid certificate may further include logging the encrypting, a reason for encrypting, or a combination thereof.

In one embodiment, the proxy may use the policy to perform the action on behalf of the receiver application such that a certificate verification function of the receiver application remains unchanged. In an embodiment, the certificate may be invalid when an expiration date of the certificate has passed, the expiration date of the certificate is more than a predetermined period old at the time of validating, the certificate is self-signed by an unauthorized entity, the certificate is self-signed and of an unauthorized class, a signer of the certificate is not a trusted signer, an entity presenting the certificate is not the same as a second entity identified as the holder of the certificate, the certificate has been revoked, the sender of the certificate is not trusted, other reasons, or a combination thereof.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
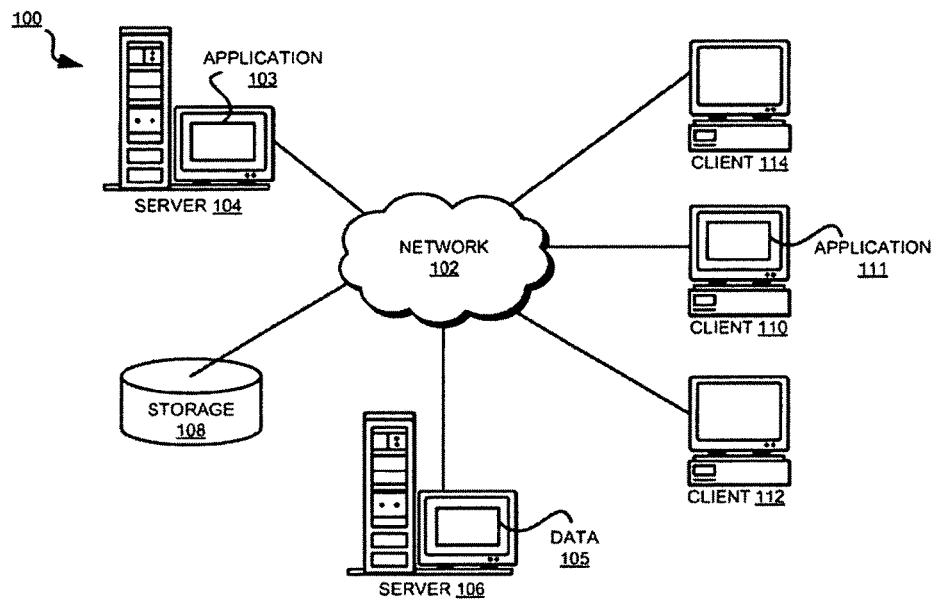
FIG. 1 depicts a pictorial representation of a network of data processing systems in which illustrative embodiments may be implemented.

When an application receives a certificate with a message, the application can perform several steps to verify that the sender of the message is actually an entity with which the application intends to establish data communication. One such step is for the application to ensure that the certificate is a valid certificate. The application can perform this step by processing the certificate against a root certificate, or a chain of certificates up to the overall root certificate, of the certificate authority who signed the certificate. A root certificate is a certificate of a certificate authority, which can be stored in a certificate repository of the application and can be used for verifying that the certificate authority trusts the holder of the certificate, such as a server of a server certificate being presented.

Further, as part of the validation of a signature on a message, not only is the encryption on the message itself validated, but the certificate associated with the key pair is also identified and validated. This validation happens by validating the certificate's signature and validating that the certificate is still valid according to its parameters, such as by verifying that the certificate is being presented between the certificate's issue and expiration dates. The validation also includes validating that the certificate authority still vouches for the certificate and has not "revoked" the certificate in any way.

A certificate that has been "revoked" is no longer a valid identity-key pair binding. This binding may no longer be valid because the keys may have been comprised, the identity may have been using the certificate fraudulently, and for other reasons. Certificates that have been revoked should not be used for the validation of signatures.

As a certificate may have a chain of issuers, validating a certificate may require several steps of checking the validity to make sure that each certificate authority in a chain still asserts that their issued certificate is valid, so that a trust chain can be built from the issuer of the "root" certificate down to the actual signing certificate.

This and other similar approaches can be used to validate certificates. In some implementations, certificate validation may rely on the receiving party having a copy of each certificate, or having the ability to retrieve the certificate in the certificate chain. The validation of a certificate for possible revocation may involve checking the certificate against a "Certificate. Revocation List" (CRL).

Illustrative embodiments recognize that certificate validation is a complex and resource intensive process. Consequently, some applications use certificates without executing certain validation steps. Not validating a certificate and consequently not enforcing the security intended behind the use of certificates may allow an application to gain some performance but may result in serious breach of security of the data communication.

For example, an application may receive a certificate, such as a server certificate from a server. The application may only verify that a valid certificate authority issued the certificate. Another application may additionally verify that the certificate has not expired. Following these verifications, the application may proceed to establish the requested communication.

The illustrative embodiments recognize that applications employing no certificate verification techniques or only limited certificate verification may permit a breach of security. For example, a sender application at a website eibay.com may send a message with a certificate issued to eibay.com. The certificate may be legitimately issued to eibay.com and may be valid within its issue and expiration dates. However, a receiver application that only verifies whether the certificate has not expired may fail to notice that the sending application is at eibay.com and not ebay.com®. (eBay and ebay.com are registered trademarks of eBay, Inc. in the United States and other countries).

The illustrative embodiments recognize that users of receiver applications may not adequately handle the confusingly similar entities named in a certificate. For example, a user presented with the certificate from eibay.com may accept the certificate by clicking a "Do you accept this certificate?" notice displayed to the user. The user may not notice the subtle difference in entity names or may not know the difference in some instances.

As another issue, the illustrative embodiments recognize that the legitimate but confusingly similar entity named in the certificate may self-sign the certificate. A self-signed certificate is, in essence, the entity named in the certificate vouching for itself. A self-signed certificate is not a desirable assurance of the identity of the entity or the validity of the certificate. Nonetheless, eibay.com may present a self-signed certificate identifying themselves as "ebay.com" and a user may fail to notice that the certificate is not from a third party certificate authority, and accept the certificate. Furthermore, a receiver application may not be configured to reject self-signed certificates either.

As another example, suppose that an application at eibay.com actually somehow acquires and presents a certificate issued to ebay.com. ebay.com having detected the certificate breach notifies the issuing certificate authority and revokes the certificate. Illustrative embodiments recognize that if the receiving application verifies only the expiration date and the identity of the owner of the certificate, the receiver application is likely to establish communication with eibay.com.

The breach of security caused by failure to fully verify and enforce certificates in this manner is undesirable. The illustrative embodiments recognize that often, users may not be aware than an application in their data processing environment may not be verifying certificates adequately and causing a security vulnerability in the data processing environment. The illustrative embodiments further recognize that certain applications, by design, may not verify certificates adequately to gain performance advantages. The illustrative embodiments further recognize that the users may or may not be able to correct an application's handling of certificates in order to correct this vulnerability.

To address these and other problems related to certificate verification and enforcement, the illustrative embodiments provide a method, system, and computer usable program product for verifying certificate use in a data processing system and for enforcing full certificate validation. The illustrative embodiments may be used in conjunction with any application or any data processing system that may use certificates, including but not limited to SSL communication.

For example, the illustrative embodiments may be implemented with a directory server, a name server, a user location service server (ULS server), an application server, a web server, a proxy server, a mail server, a feed server, or any other type of data server. The illustrative embodiments may also be implemented with any business application, enterprise software, and middleware applications or platforms. Additionally, the illustrative embodiments may be implemented in conjunction with a hardware component, such as in a firmware, as embedded software in a hardware device, or in any other suitable hardware or software form.

Any advantages listed herein are only exemplary and are not intended to be limiting on the illustrative embodiments. Additional advantages may be realized by specific illustrative embodiments. Furthermore, a particular illustrative embodiment may have some, all, or none of the advantages listed above.

Figure 2:
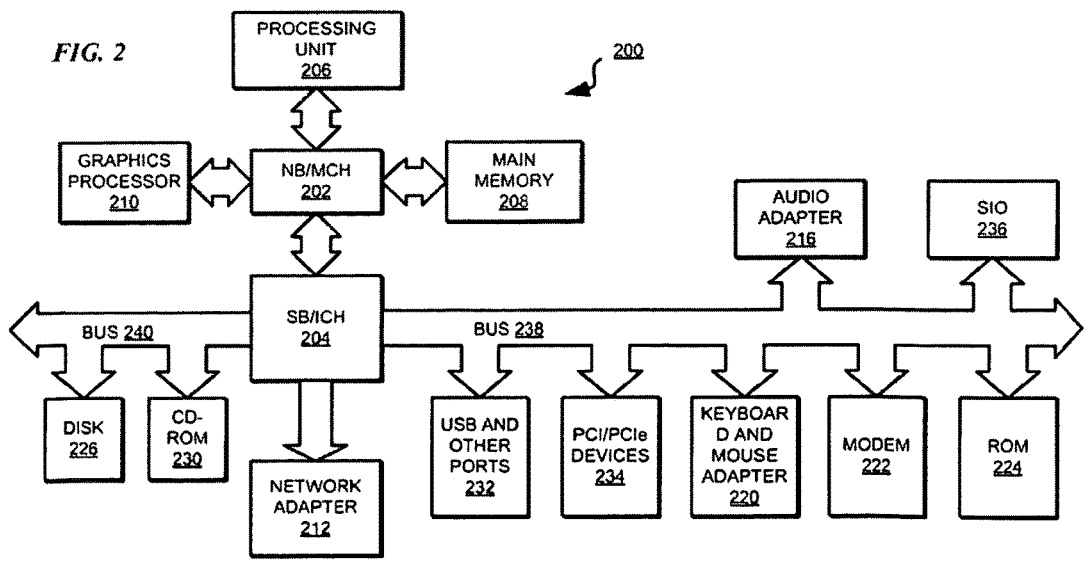
FIG. 2 depicts a block diagram of a data processing system in which illustrative embodiments may be implemented.

With reference to the figures and in particular with reference to FIGS. 1 and 2, these figures are exemplary diagrams of data processing environments in which illustrative embodiments may be implemented. FIGS. 1 and 2 are only exemplary and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108.

Software applications may execute and data may reside on any computer in data processing environment 100. In the depicted example, server 104 includes application 103 and server 106 includes data 105, which may be example software and data, in conjunction with which the illustrative embodiments may be implemented. For example, application 103 may be a proxy server that may include one or more illustrative embodiments. As another example, data 105 in server 106, or data in storage unit 108, may be a set of policies in accordance with the illustrative embodiments. A set of policies is one or more policy. A policy is a rule or instruction to take a certain action given a certain condition. Application 111 in client 110 may be a receiver application that receives certificates and messages from sender applications.

In addition, clients 110, 112, and 114 couple to network 102. Any of clients 110, 112, and 114 may have an application, typically a client application, executing thereon. As an example, client 110 is depicted to have browser 109 executing thereon. Browser 109 may be a commonly used web-browser. Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
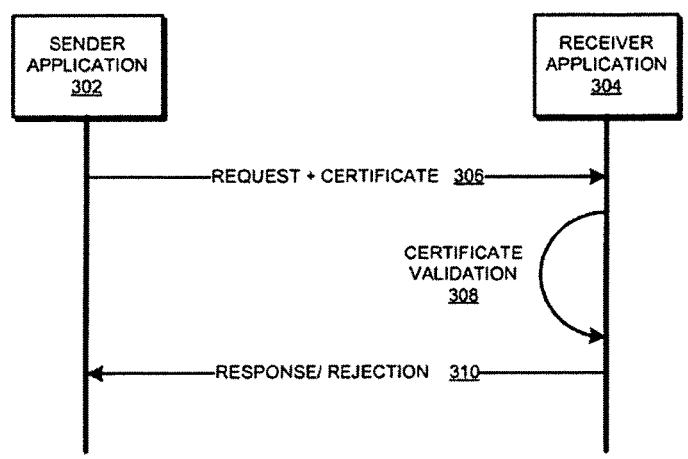
FIG. 3 depicts a block diagram of a certification verification in which the illustrative embodiment may be implemented.

With reference to FIG. 3, this figure depicts a block diagram of a certification verification in which the illustrative embodiment may be implemented.

Sender application 302 may be an application that may present a certificate to receiver application 304. Sender application 302 may send message 306 that may include a request and a certificate. Receiver application 304 may perform certificate validation 308 on the certificate of message 306. Receiver application 304 may return response or rejection 310 based on certificate validation 308.

In some present instances, receiver application 304 may skip certificate validation 308. In other present instances, receiver application 304 may perform inadequate certificate validation 308, as described above. Consequently, without the benefits of the illustrative embodiments, receiver application 304 may respond to an improper sender application 302. Similarly, without the benefits of the illustrative embodiments, receiver application 304 may reject a message that may include an invalid certificate but where an administrator or a business objective may call for responding to the message.

Figure 4:
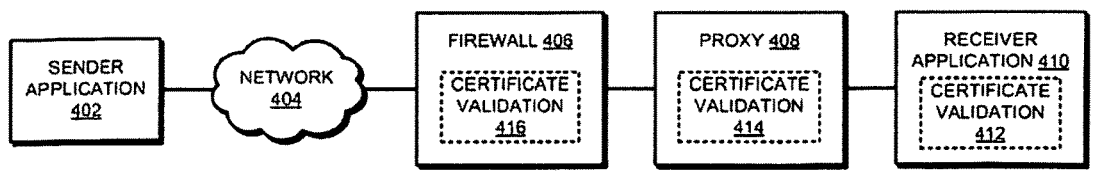
FIG. 4 depicts a block diagram of certificate validation configuration in accordance with an illustrative embodiment.

With reference to FIG. 4, this figure depicts a block diagram of certificate validation configuration in accordance with an illustrative embodiment. Sender application 402 may be similar to sender application 302 in FIG. 3. Network 404 may be analogous to network 102 in FIG. 1. Firewall 406 may be a firewall application executing on a data processing system coupled to network 404, such as on server 104 in FIG. 1. Proxy 408 may be a proxy server application, such as application 103 in FIG. 1. Receiver application 410 may be similar to receiver application 304 in FIG. 3.

Receiver application 410 may include certificate validation component 412 that may perform certificate validation similar to certificate validation 308 in FIG. 3. In some implementations, certificate validation component 412 may be entirely missing.

Proxy 408 may include certificate validation component 414 in accordance with an illustrative embodiment. Firewall 406 may also include certificate validation component 416 according to an illustrative embodiment.

Depending on the particular implementation of the illustrative embodiments, each of certificate validation components 412, 414, and 416 may perform parts of certificate validation process or perform different types of validations on a given certificate. For example, in one embodiment, certificate validation component 416 in firewall 406 may only do a validity check of a certificate to the extent needed for establishing a SSL session. If a certificate is invalid for the SSL session, the message may be rejected at firewall 406 and may not reach proxy 408 or receiver application 410.

In another embodiment, certificate validation component 414 in proxy 408 may perform any certificate validation function that may be lacking in certificate validation component 412. For example, certificate validation component 414 may verify whether or not a certificate is on a certificate revocation list, a function that receiver application 410 may not have implemented in certification validation component 412.

Normally, when a certificate is carried with a message, firewall 406 may check the certificates as the SSL/transport layer, but may not check a certificate revocation list. Additionally, when the certificate is carried with the message, proxy 408 may check the authentication use of the certificate at the message layer, and may or may not have to check a certificate revocation list depending on the implementation.

When the certificate is carried with the message, receiver application 410 may check the signed message or data fields in the message at the application level. Almost all checking can include checking for expired certificates when the certificate is carried with the message.

In some instances, a certificate may retrieved from a local storage for use with a message. In such instances, the normal processing described above may not occur. In implementations including certificate retrieval from local stores; proxy 408 may provide additional checking functionality with respect to the certificate, including checking the retrieved certificate against certificate revocation lists as described above.

Figure 5:
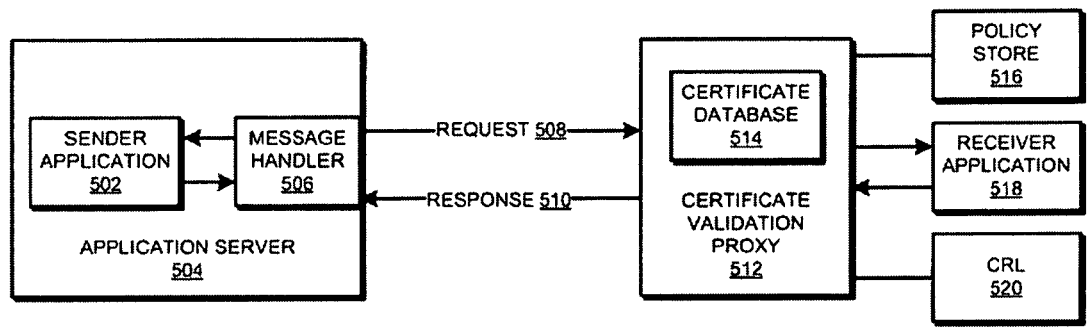
FIG. 5 depicts a block diagram of a proxy based certificate validation and enforcement in accordance with an illustrative embodiment.

With reference to FIG. 5, this figure depicts a block diagram of a proxy based certificate validation and enforcement in accordance with an illustrative embodiment. Sender application 502 may be similar to sender application 402 in FIG. 4 and may execute in application server 504. Application server 504 may include message handler 506. Sender application 502 may send and receive messages including certificates using message handler 506. Request 508 and response 510 may be such messages.

Certificate validation proxy 512 may be analogous to proxy 408 in FIG. 4 including certain illustrative embodiments. Certificate database 514 may be a repository of certificates accessible to certificate validation proxy 512. Certificate database 514 may store zero or more certificates that certificate validation proxy 512 may use for signing and encrypting messages. Certificate database 514 may also store certificates of zero or more sender applications that certificate validation proxy 512 accepts as valid. Additionally, certificate database 514 may store zero or more root certificates from various certificate authorities.

Furthermore, certificate database 514 may include zero or more certificates from senders of messages. When storing certificates for sender applications, users, and data processing systems, certificate database 514 is also known as a local store. An application, such as receiver application 518, certificate validation proxy 512, and other applications may retrieve a certificate corresponding to a sender from certificate database 514 to use in conjunction with a message from the sender. Using certificate database 514 in this manner saves network bandwidth as certificates do not have to be transmitted with each message. Certificate database 514 may be implemented using a database, a flat file, an index file, hardware based storage, or any other data structure suitable for storing data.

Policy store 516 may be a repository of one or more policies and may be accessible to certificate validation proxy 512. Users, such as system administrators, may create policies or rules for processing messages in their data processing systems. For example, a user may create a policy that allows a message to be processed even if the certificate included in the message is invalid if the message originates from a certain network address or a certain network domain.

Business objectives may also trigger creation of message handling policies. For example, a business organization may determine that messages from a certain trading partner require closer scrutiny. Consequently, a policy requiring rejection of any message from that trading partner that includes a certificate with any type of invalidity whatsoever. A type of invalidity of a certificate is a failure of a certain combination of parameters of the certificate in meeting a specific validity requirement.

These examples of policies are not intended to be limiting on the illustrative embodiments. Many other types of policies from many other sources will be apparent from this disclosure and the same are contemplated within the scope of the illustrative embodiments. For example, a receiving application, such as receiving application 518, may introduce a policy for handling messages meant for that application within the scope of the illustrative embodiments.

Certificate revocation list 520 may be accessible to certificate validation proxy 512. Certificate revocation list 520 may be a list of revoked certificates maintained by a certificate authority or another system or entity.

Certificate validation proxy 512 may use certificate database 514, policy store 516, certificate revocation list 520, other systems, other information, or any combination thereof, for validating certificates. In so validating the certificates received from sender applications, certificate validation proxy 512 may augment the certificate validation functionality of receiver application 518, if any, without requiring changes to such applications. In other words, certificate validation proxy 512 according to the illustrative embodiments may remedy a breach of security caused by inadequate certificate validation of certain applications without the users of those applications knowing or the developers of those applications having to rewrite code.

Furthermore, a policy in policy store 516 may allow certificate validation proxy 512 to correct certain certificate validation errors and send properly encrypted or signed messages to receiver application 518. Certificate validation proxy 512 may be able to sign or encrypt otherwise invalid message 508 with a valid certificate from certificate database 514 and send to receiver application 518.

For example, a particular implementation of receiver application 518 may always require a valid certificate and not perform any certificate validation at all. A policy to always provide messages with valid certificates to such an application may require certificate validation proxy 512 to sign or encrypt message 508 with its own certificate from certificate database 514. Additionally, such a policy may also cause certificate validation proxy 512 to log this event. Operating in this manner, the illustrative embodiments may trace a reference to the valid certificate and signature to the policy implementation. Such a policy may be used to allow, for example, a message with an expired certificate to be processed if the certificate expired within two minutes and the message was initially created three minutes previously.

Message 508, so modified, may then be passed to receiver application 518. Thus, receiver application 518 can be sure that all certificates received at receiver application 518 are valid certificates.

As another example, a particular implementation of receiver application 518 may not perform any certificate validation at all. In this example, certification validation proxy may perform the signature validation associated with the message and simply forward the message as appropriate based on the policy and signature validation results.

Figure 6:
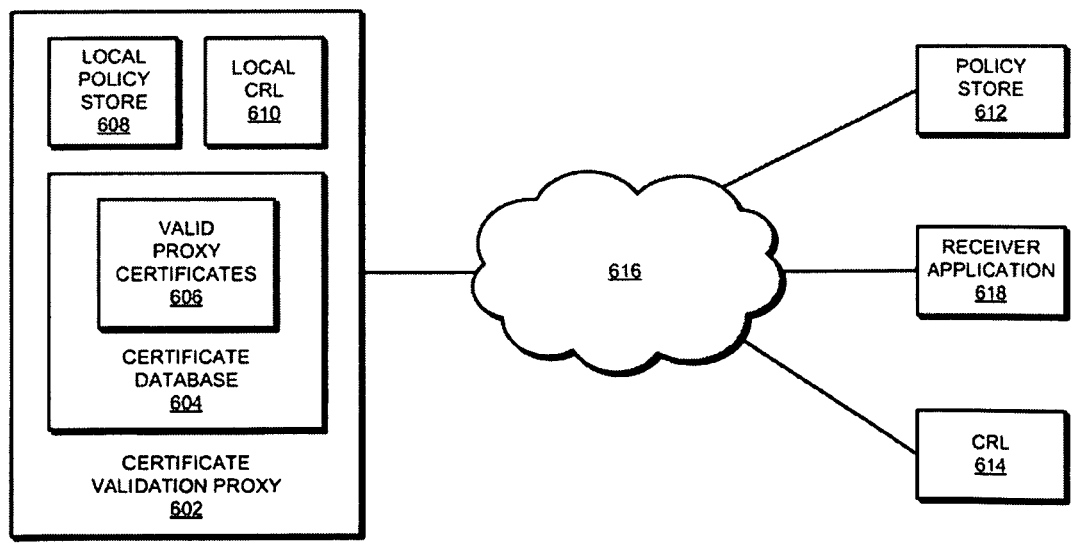
FIG. 6 depicts a block diagram of a certificate validation proxy configuration in accordance with an illustrative embodiment.

With reference to FIG. 6, this figure depicts a block diagram of a certificate validation proxy configuration in accordance with an illustrative embodiment. Certificate validation proxy 602 may be used as certificate validation proxy 512 in FIG. 5. Certificate validation proxy 602 may include certificate database 604, which may be analogous to certificate database 514 in FIG. 5. Certificate database 604 may include valid certificate 606 that certificate validation proxy 602 may itself use for signing or encrypting messages.

Certificate validation proxy 602 may include local policy store 608. Local policy store 608 may include policies designed to be stored locally at certificate validation proxy 602, or may include copies of policies that certificate validation proxy 602 may make from other locations from time to time.

Certificate validation proxy 602 may include local certificate revocation list 610. Local certificate revocation list 610 may include a listing of revoked certificates that certificate validation proxy 602 may itself create, or may include copies of one or more certificate revocation lists that certificate validation proxy 602 may make from other locations from time to time.

Certificate validation proxy 602 may further have access to policy store 612 that may be stored at another data processing system. Certificate validation proxy 602 may also have access to certificate revocation list 614, such as a certificate revocation list maintained by a third party certificate authority.

Certificate validation proxy 602 may access policy store 612 and certificate revocation list 614 over network 616. Certificate validation proxy 602 may similarly have access to any number of policy stores and certificate revocation lists over network 616. Certificate validation proxy 602 may communicate with receiver application 618 over network 616 as well.

Figure 7:
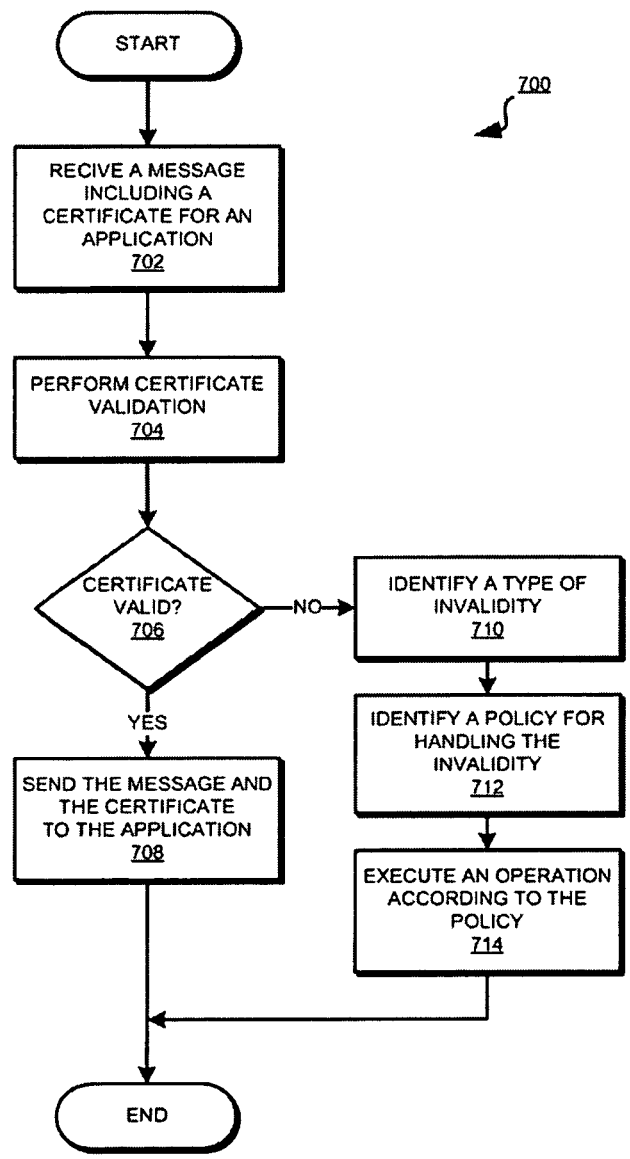
FIG. 7 depicts a flowchart of a process of certificate validation and enforcement in accordance with an illustrative embodiment.

With reference to FIG. 7, this figure depicts a flowchart of a process of certificate validation and enforcement in accordance with an illustrative embodiment. Process 700 may be implemented in a certificate validation proxy, such as certificate validation proxy 602 in FIG. 6.

Process 700 begins by receiving a message including a certificate from an application (step 702). Process 700 performs certificate validation on the certificate in the message (step 704). Process 700 may, for example, validate the issue date, the expiration date, the name of the holder entity, the status of the certificate with a root certificate authority in the certificate's chain of trust, and whether or not the certificate is on a certificate revocation list, among validation of any other parameter of the certificate as may be useful in a particular implementation of the illustrative embodiments.

Process 700 determines whether the certificate being presented is valid (step 706). If the certificate is valid ("Yes" path of step 706), process 700 sends the message and the certificate to a receiver application that may be the target of the message received in step 702 (step 708). Process 700 ends thereafter.

If, however, the certificate is invalid for any reason ("No" path of step 706), process 700 identifies a type of invalidity (step 710). Identifying a type of invalidity is identifying a set of parameters of the certificate that are not in accordance with the valid use of the certificate. A set of parameters is one or more parameters.

Process 700 identifies a policy for handling the type of invalidity identified in step 710 (step 712). In one embodiment, a policy may direct process 700 as to only the type of invalidity, regardless of the entity of the sender. In another embodiment, a policy may direct process 700 to examine other valid or invalid parameters of the invalid certificate and take an action dependent upon a combination of parameters including the parameters causing the specific type of invalidity of step 710.

Figure 8:
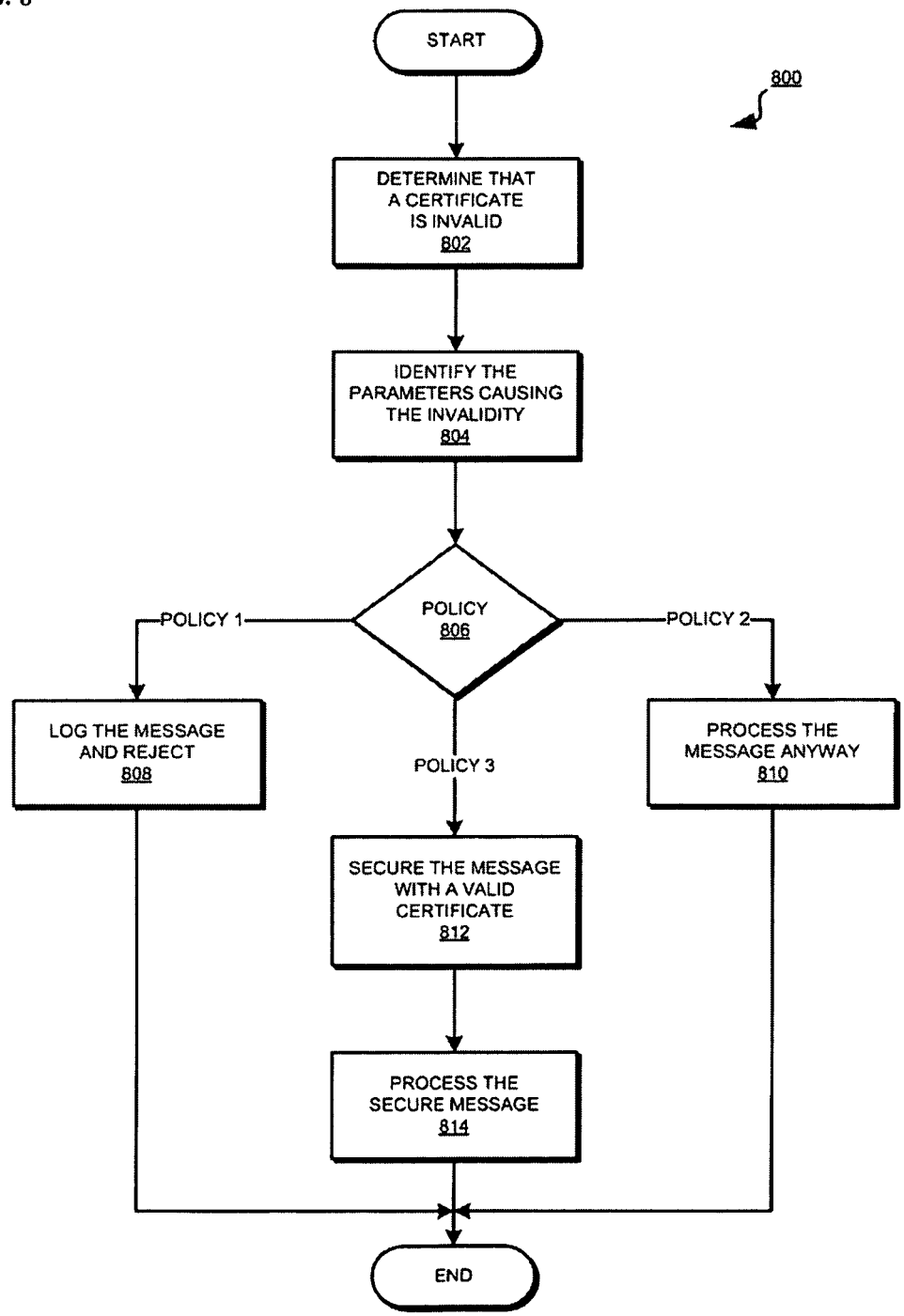
FIG. 8 depicts a flowchart of a process of handling invalid certificates in accordance with an illustrative embodiment.

Process 700 executes an operation, takes an action, or performs a task according to the policy (step 714). FIG. 8 provides some examples of operations process 700 may execute in step 714. Process 700 ends thereafter.

With reference to FIG. 8, this figure depicts a flowchart of a process of handling invalid certificates in accordance with an illustrative embodiment. Process 800 may be implemented in a certificate validation proxy, such as certificate validation proxy 602 in FIG. 6. Further, steps of process 800 may be implemented for executing certain steps of process 700, for example, step 714 in FIG. 7.

Process 800 begins by determining that a certificate being presented is invalid (step 802). As described above, the invalidity of the certificate may arise from one or more parameters of the certificate failing to meet certain validity requirements. For example, all the parameters of the certificate may be valid, but the certificate may match an entry in a certificate revocation list making the certificate invalid. As another example, the name of the holder of the certificate may indicate the true holder of the certificate but the presenter of the certificate may not be that holder entity, making the certificate invalid.

As another example, the holder and the presenter of the certificate may be one and the same, and all other parameters of the certificate may also be valid, but the presenter entity may have self-signed the certificate. In such a situation, deeming the certificate invalid may be a way to prevent communications with the self-signing named entity.

In the above examples, not finding a matching entry in a certificate revocation list, identical holder and presenter entities, not having misleadingly similar but different presenter entity and intended entity names are some examples of validity requirements or validity tests. Another example of a validity test may be that the certificate must include a representation of a key/algorithm combination with the appropriate key strength. Furthermore, the validity requirements may be imposed by a certificate authority, an entity in the trust chain of the certificate, a receiver of the certificate, or a combination thereof. Note that an implementation may design a validity requirement suitable for the particular implementation without departing from the scope of the illustrative embodiments.

Process 800 may identify one or more parameters of the certificate that are the cause of invalidity (step 804). Process 800 locates a policy based on the invalidity, the parameters identified in step 804, or a combination thereof (step 806).

According to one policy ("Policy 1" path of step 806), process 800 may make a log file entry using the message and the included certificate and reject the message due to the invalidity (step 808). Process 800 may end thereafter.

According to another policy ("Policy 2" path of step 806), process 800 may process the message regardless of the included invalid certificate (step 810). Process 800 may end thereafter. Processing of step 810 may be any processing suitable for a particular implementation, such as, among other possible processing, forwarding to a receiver application, translation of the message, and responding to the message.

According to another policy ("Policy 3" path of step 806), process 800 may secure the message using a valid certificate, such as a valid certificate belonging to a certificate validation proxy, (step 812). Process 800 may process the secured message in a manner similar to step 810 (step 814). Process 800 may end thereafter.

Figure 9:
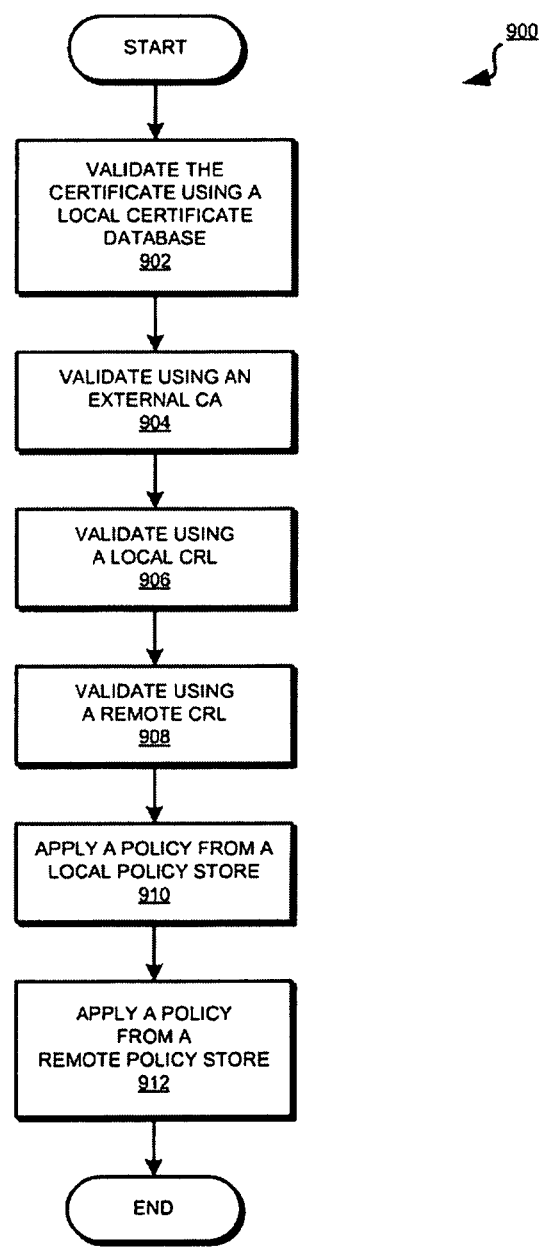
FIG. 9 depicts a flowchart of a process of validating certificates in accordance with an illustrative embodiment.

With reference to FIG. 9, this figure depicts a flowchart of a process of validating certificates in accordance with an illustrative embodiment. Process 900 may be implemented in a certificate validation proxy, such as certificate validation proxy 602 in FIG. 6. Further, steps of process 900 may be implemented for executing certain steps of process 700, for example, step 704 in FIG. 7.

In one embodiment, if the certificate is carried with the message, process 900 may validate the parameters of the cert before performing any steps shown in this figure. In another embodiment, where the certificate is not carried with the message, such as when the certificate is retrieved from a local store, the certificate can be retrieved and validated as described here.

Process 900 begins by validating a certificate received with a message using a local certificate database, such as certificate database 604 in FIG. 6, (step 902). Process 900 may also utilize an external certificate authority, such as a third party issuer of the certificate, to validate the certificate (step 904).

Process 900 may use a local certificate revocation list, such as local certificate revocation list 610 in FIG. 6, to determine whether the certificate has been revoked (step 906). Process 900 may further use a remote certificate revocation list, such as certificate revocation list 614 in FIG. 6, which an external certificate authority or another entity may maintain (step 908).

Based on the determinations of the steps 902-908, as well as other validity determinations, such as determined by steps 802-804 of process 800, process 900 may select and apply a policy from a local policy store to process the message associated with the certificate (step 910). Alternatively, or cumulatively, process 900 may select and apply a policy from a remote policy store, such as policy store 612, to process the message associated with the certificate (step 912). Process 900 ends thereafter.

Each step of process 900 may not be required in a particular implementation. For example, in one embodiment, process 900 may only apply a local policy in step 910 and omit applying a policy from a remote policy store as in step 912. Similarly, another embodiment may use only a remote certificate revocation list as in step 908 and omit step 906.

Furthermore, steps of process 900 are not exhaustive of the validation procedures and the sources of validation information available in a particular implementation. The validation procedures and the sources described in process 900 are only examples for the clarity of the description and not intended to be limiting on the illustrative embodiments. An implementation may use additional validation procedures and utilize additional sources of validation information for that purpose without departing from the scope of the illustrative embodiments.

The components in the block diagrams and the steps in the flowcharts described above are described only as exemplary. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for verifying and enforcing certificate use. By implementing the illustrative embodiments, a certificate validation proxy according to the illustrative embodiments may be able to back-fill certificate validation and enforcement functions that may be lacking in a receiver application. The certificate validation proxy according to the illustrative embodiments may perform the certificate validation and enforcement functions by using locally stored policies, certificate revocation lists, and certificates, or by calling out to external policy stores, certificate revocation lists, and certificate databases.

The certificate validation proxy may also perform a validation of the full certificate chain associated with a certificate, a function that is usually omitted in most applications due to the processing costs associated with such validations. The certificate validation proxy according to the illustrative embodiments can act as a true proxy in data communications and, in response to policy, allow communications that would normally have failed.

As an example, a policy used by the certificate validation proxy of the illustrative embodiments may allow the use of an expired certificate that has been issued by a particular certificate authority as long as expiration is less than a predetermined period old. As another example, a policy may allow the use of a self-signed certificate only if self-signed by a trusted entity, but not others.

A policy may allow certain types of communication to continue, based on factors such as the nature of the invalidity and the actual certificate checking abilities of the receiver application. As another example, a local or remote policy may cause a communication to fail, even if the certificate is not expired and does not exist on any certificate revocation list lists, because the certificate is a self-signed certificate and not a VeriSign® issued class 3 certificate (VeriSign is a trademark of VeriSign, Inc. in the United States and other countries).

As another example, the local policy may allow a communication to pass, even if a certificate associated with the communication is expired, because a local configuration may indicate that a receiver application does not do adequate certificate checking and therefore will not fail even if it receives an invalid certificate. As another example, a local policy may cause a similar communication to fail, because the certificate did not pass validation processing, and it is known that the receiver application will also fail the communication. Such a policy and certificate validation according to the illustrative embodiment may enable an implementation of a first point of failure at the certificate validation proxy instead of at the receiver application.

As another example, a policy according to the illustrative embodiments may allow an invalid certificate received from sender application to be replaced with a locally-stored valid certificate, thus allowing re-signing and re-encrypting the message. The policy may allow such a function because the policy may allow an expired certificate to be treated as valid for up to a certain period past the expiration as described above, but the receiver application may cause such a communication to fail because the receiver application may not able to implement this policy.

Implementing a policy and certificate validation proxy according to the illustrative embodiments may resolve sometimes conflicting business and technical requirements. For example, a receiver application may include a restrictive policy about processing certificates, such as requiring only valid certificates. A business objective may require a comparatively relaxed certificate processing policy, such as allowing certificates that expired within a threshold period because of management or administrative issues in updating local stores with new certificates. Certificate validation proxy may use a valid certificate to re-sign or re-encrypt the message according to the illustrative embodiments to allow both the business objective and the technical restrictions to be achieved.

The certificate validation proxy according to the illustrative embodiments may be used to implement an application's "out of the box" certificate validation processing, either by instrumenting the app to call the certificate validation proxy or by having the certificate validation proxy act as a true proxy by acting as local certificate processing, such as certificate processing carried with a Java Runtime Environment (JRE) deployment in an Java Cryptography Extension (JCE).

Where improving the certificate validation and enforcement process of an application is not a viable option, a user may be able to configure the certificate validation proxy to intercept all messages to and from the client application and handle the certificate processing. For example, the certificate validation proxy can examine the certificate from a message without damaging the message and perform its own validation processing. If the certificate passes the proxy based certification validation checks, the proxy can forward the message to the client application for normal processing. If the certificate does not pass the proxy based checks, then proxy can be configured for a variety of responses, such as returning an error, logging, refusing a data connection, encrypting or signing with a valid certificate, or processing the message regardless of the errors.

The illustrative embodiments are also similarly applicable to configurations where a certificate is not carried with a message, only a signature is carried with the message, and the certificate is stored locally. In such cases the certificate validation proxy may validate a certificate when an application performs a key retrieval from a certificate storage. The proxy can extract the certificate associate with the requested key and validate the certificate using proxy based validation.

The illustrative embodiments may also notify the user or take other implementation specific actions for certificates that may have been revoked by the issuing certificate authority, or may be otherwise invalid. As a further enhancement, the illustrative embodiments may provide that the certificate validation proxy occasionally or periodically scan the certificate database, local policy store, local certificate revocation list, and update them from other sources, such as remote policy stores, remote certificate revocation lists, and third party certificate databases.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for verifying and enforcing certificate use, the computer implemented method comprising:
   receiving, at a certificate validation proxy, using a processor and a memory in a computer, a certificate from a sender;
   validating the certificate at the certificate validation proxy, by determining whether the certificate is invalid, before communicating a message associated with the certificate to a receiver;
   selecting at the certificate validation proxy, responsive to the certificate being invalid, a policy based on a type of invalidity of the certificate;
   taking an action at the certificate validation proxy to enforce the policy for using the certificate.

2. The computer implemented method of claim 1, wherein the validating further comprises:
   verifying the validity of the certificate using a certificate from a certificate database, and wherein the certificate database is accessible to the certificate validation proxy over a network.

3. The computer implemented method of claim 2, wherein the certificate validation proxy copies a part of the certificate database accessible over to the network to a second certificate database local to the certificate validation proxy.

4. The computer implemented method of claim 1, wherein the validating further comprises:
   verifying the validity of the certificate using a certificate revocation list, wherein the certificate revocation list is accessible to the certificate validation proxy over a network.

5. The computer implemented method of claim 4, wherein the certificate validation proxy copies a part of the certificate revocation list accessible over to the network to a second certificate revocation list local to the certificate validation proxy.

6. The computer implemented method of claim 1, wherein selecting the policy further comprises:
   selecting the policy from a policy store, wherein the policy store is accessible to the certificate validation proxy over a network.

7. The computer implemented method of claim 6, wherein the certificate validation proxy copies a part of the policy accessible over to the network to a second policy store local to the certificate validation proxy.

8. The computer implemented method of claim 1, wherein an action according to the policy includes encrypting the message with a valid certificate and wherein the encrypting the message with the valid certificate further includes logging a reason for encrypting.

9. The computer implemented method of claim 1, wherein an action according to the policy includes signing the message with a valid certificate, wherein the signing the message with the valid certificate further includes logging a reason for signing.

10. The computer implemented method of claim 8, wherein the certificate validation proxy uses the policy to perform the action on behalf of the receiver application such that a certificate verification function of the receiver application remains unchanged.

11. The computer implemented method of claim 1, the certificate is invalid when the expiration date of the certificate is more than a predetermined period old at the time of validating.

12. A computer usable program product comprising a non-transitory computer usable medium including computer usable code for verifying and enforcing certificate use, the computer usable code comprising:
   computer usable code for receiving at a certificate validation proxy a certificate from a sender;
   computer usable code for validating the certificate at the certificate validation proxy, by determining whether the certificate is invalid, before communicating a message associated with the certificate to a receiver;
   computer usable code for selecting at the certificate validation proxy, responsive to the certificate being invalid, a policy based on a type of invalidity of the certificate;
   computer usable code for taking an action at the certificate validation proxy to enforce the policy for using the certificate.

13. The computer usable program product of claim 12, wherein the computer usable code for validating further comprises:
   computer usable code for verifying the validity of the certificate using a certificate from a certificate database, and wherein the certificate database is accessible to the certificate validation proxy over a network.

14. The computer usable program product of claim 13, wherein the certificate validation proxy copies a part of the certificate database accessible over to the network to a second certificate database local to the certificate validation proxy.

15. The computer usable program product of claim 12, wherein the computer usable code for validating further comprises:
   computer usable code for verifying the validity of the certificate using a certificate revocation list, wherein the certificate revocation list is accessible to the certificate validation proxy over a network.

16. The computer usable program product of claim 15, wherein the certificate validation proxy copies a part of the certificate revocation list accessible over to the network to a second certificate revocation list local to the certificate validation proxy.

17. The computer usable program product of claim 12, wherein the computer usable code for selecting the policy further comprises:
   computer usable code for selecting the policy from a policy store, wherein the policy store is accessible to the certificate validation proxy over a network.

18. The computer usable program product of claim 17, wherein the certificate validation proxy copies a part of the policy accessible over to the network to a second policy store local to the certificate validation proxy.

19. The computer usable program product of claim 12, wherein the computer usable code for taking the action according to the policy includes computer usable code for encrypting the message with a valid certificate and wherein the computer usable code for encrypting the message with the valid certificate further includes computer usable code for logging a reason for encrypting.

20. The computer usable program product of claim 12, wherein the computer usable code for taking the action according to the policy includes computer usable code for signing the message with a valid certificate, wherein the computer usable code for signing the message with the valid certificate further includes computer usable code for logging a reason for signing.

21. The computer usable program product of claim 19, wherein a computer usable code for in the certificate validation proxy uses the policy to perform the action on behalf of the receiver application such that a computer usable code for certificate verification function of the receiver application remains unchanged.

22. The computer usable program product of claim 12, the certificate is invalid when the certificate is self-signed and of an unauthorized class.

23. A data processing system for verifying and enforcing certificate use, the data processing system comprising:
   a storage device including a storage medium, wherein the storage device stores computer usable program code; and
   a processor, wherein the processor executes the computer usable program code, and wherein the computer usable program code comprises:
   computer usable code for receiving at a certificate validation proxy a certificate from a sender;

computer usable code for validating the certificate at the certificate validation proxy, by determining whether the certificate is invalid, before communicating a message associated with the certificate to a receiver;

computer usable code for selecting at the certificate validation proxy, responsive to the certificate being invalid, a policy based on a type of invalidity of the certificate;

computer usable code for taking an action at the certificate validation proxy to enforce the policy for using the certificate.

24. The data processing system of claim 23, wherein the computer usable code for validating further comprises:

computer usable code for verifying the validity of the certificate using a certificate from a certificate database, wherein the certificate database is accessible to the certificate validation proxy over a network; and computer usable code for copying a part of the certificate database accessible over to the network to a second certificate database local to the certificate validation proxy.

25. The data processing system of claim 23, wherein the computer usable code for validating further comprises:

computer usable code for verifying the validity of the certificate using a certificate revocation list, wherein the certificate revocation list is accessible to the certificate validation proxy over a network; and computer usable code for copying a part of the certificate revocation list accessible over to the network to a second certificate revocation list local to the certificate validation proxy.

26. The data processing system of claim 23, wherein the computer usable code for selecting the policy further comprises:

computer usable code for selecting the policy from a policy store, wherein the policy store is accessible to the certificate validation proxy over a network; and computer usable code for copying a part of the policy accessible over to the network to a second policy store local to the certificate validation proxy.

27. The data processing system of claim 23, wherein the computer usable code for taking the action according to the policy includes computer usable code for encrypting the message with a valid certificate and wherein the encrypting the message with the valid certificate further includes logging a reason for encrypting.

28. The data processing system of claim 27, wherein the computer usable code for signing the message with a valid certificate further includes computer usable code for logging a reason for signing.

29. The data processing system of claim 27, wherein a computer usable code in the certificate validation proxy uses the policy to perform the action on behalf of the receiver application such that a computer usable code for certificate verification function of the receiver application remains unchanged.

30. The data processing system of claim 23, the certificate is invalid when an entity presenting the certificate is not the same as a second entity identified as the holder of the certificate.

31. A system for verifying and enforcing certificate use, the system comprising:

a certificate validation proxy for receiving a certificate from a sender;

computer usable code means for validating the certificate, by determining whether the certificate is invalid, before communicating a message associated with the certificate to a receiver;

computer usable code means for selecting, responsive to the certificate being invalid, a policy based on a type of invalidity of the certificate;

computer usable code means for taking an action to enforce the policy for using the certificate.

32. The system of claim 31, wherein the means for validating the certificate further comprises:

computer usable code means for verifying the validity of the certificate using a certificate revocation list, wherein the certificate revocation list is accessible to the certificate validation proxy over a network; and computer usable code means for copying a part of the certificate revocation list accessible over to the network to a second certificate revocation list local to the certificate validation proxy.

33. The system of claim 31, wherein the means for selecting the policy further comprises:

computer usable code means for selecting the policy from a policy store, wherein the policy store is accessible to the certificate validation proxy over a network; and computer usable code means for copying a part of the policy accessible over to the network to a second policy store local to the certificate validation proxy.

34. The system of claim 31, wherein the means for taking the action according to the policy includes computer usable code means in the proxy for encrypting the message with a valid certificate and wherein the encrypting the message with the valid certificate further includes logging a reason for encrypting.

35. The system of claim 34, wherein the certificate validation proxy uses the policy to perform the action on behalf of the receiver application such that a certificate verification function of the receiver application remains unchanged.

* * * * *